US012012795B2

(12) United States Patent
Dreyer

(10) Patent No.: US 12,012,795 B2
(45) Date of Patent: Jun. 18, 2024

(54) SWING DOOR OPERATOR

(71) Applicant: Assa Abloy Entrance Systems AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 236 days.

(21) Appl. No.: 17/605,211

(22) PCT Filed: Apr. 29, 2020

(86) PCT No.: PCT/EP2020/061858

§ 371 (c)(1),
(2) Date: Oct. 20, 2021

(87) PCT Pub. No.: WO2020/229175

PCT Pub. Date: Nov. 19, 2020

(65) Prior Publication Data

US 2022/0235595 A1 Jul. 28, 2022

(30) Foreign Application Priority Data

May 13, 2019 (SE) .................................... 1930154-8

(51) Int. Cl.
*E05F 15/00* (2015.01)
*E05F 15/40* (2015.01)
*E05F 15/63* (2015.01)

(52) U.S. Cl.
CPC .............. *E05F 15/40* (2015.01); *E05F 15/63* (2015.01); *E05Y 2400/36* (2013.01);
(Continued)

(58) Field of Classification Search
CPC ......... E05F 2015/483; E05F 5/06; E05F 5/00; E05F 15/43; E05F 15/40; E05F 15/60;
(Continued)

(56) References Cited

U.S. PATENT DOCUMENTS 4,967,083 A 10/1990 Kornbrekke et al.
5,583,405 A 12/1996 Sai et al.
(Continued)

FOREIGN PATENT DOCUMENTS

| | | |
|---|---|---|
| DE | 3422228 | 12/1985 |
| DE | 102008044990 | 3/2010 |
| EP | 0789127 | 8/1997 |

OTHER PUBLICATIONS

International Search Report in PCT/EP2020/061858 dated Aug. 7, 2020.
Swedish Search Report in 1930154-8 dated Nov. 7, 2019.

*Primary Examiner* — Chi Q Nguyen
(74) *Attorney, Agent, or Firm* — Wissing Miller LLP

(57) ABSTRACT

A swing door operator (10) for moving a swing door leaf (20) in a swing path between an open and closed position, the swing door operator (10) comprising at least one drive unit (100) being arranged to move the swing door leaf (10), a control unit (103) being operatively connected to the drive unit (100) and a first sensor (106). The first sensor (106) is configured to identify objects in front of a first side (201) of the swing door leaf (20) and the control unit (103) is configured to react if an object is identified by the first sensor
(Continued)

(106) in a safety zone (30) in front of the first side (201) of the swing door leaf (20). The control unit (100) is also configured to adapt the size/area of the safety zone (30) based on the swing path of the swing door leaf (20), the position of the swing door leaf (20) and on limitation information received via a communication means.

17 Claims, 4 Drawing Sheets

(52) U.S. Cl.
CPC ....... *E05Y 2400/44* (2013.01); *E05Y 2400/58* (2013.01); *E05Y 2900/112* (2013.01); *E05Y 2900/132* (2013.01)

(58) Field of Classification Search
CPC ......... E05F 15/70; E05F 15/73; E05F 15/632; E05F 2017/005; E05Y 2400/504; E05Y 2400/458; E05Y 2400/502; E05Y 2800/404; E05Y 2400/852; E05Y 2400/508; E05Y 2900/132; E05Y 2400/50; E05Y 2201/254; E05Y 2400/21; E05Y 2201/25; E05Y 2201/256; E05Y 2201/21; E05Y 2400/532; E05Y 2900/531
USPC ............. 49/31, 26, 28, 36; 250/221; 701/49, 701/301, 45, 36, 26; 340/901, 540; 318/480, 445
See application file for complete search history.

(56) References Cited

U.S. PATENT DOCUMENTS

| | | | | |
|---|---|---|---|---|
| 9,163,446 | B2 * | 10/2015 | Houser | E05F 15/73 |
| 9,514,583 | B2 * | 12/2016 | Zasowski | G06F 3/0482 |
| 10,837,212 | B2 * | 11/2020 | Hucker | E05F 15/63 |
| 11,072,965 | B2 * | 7/2021 | Soderqvist | E05F 1/006 |
| 11,098,519 | B2 * | 8/2021 | Dreyer | E05F 15/73 |
| 11,168,508 | B2 * | 11/2021 | Dreyer | E05F 15/40 |
| 11,199,038 | B2 * | 12/2021 | Dreyer | E05F 15/70 |
| 11,199,041 | B2 * | 12/2021 | Yulkowski | E05F 15/00 |
| 11,532,192 | B2 * | 12/2022 | Hass | G07C 9/27 |
| 11,536,075 | B2 * | 12/2022 | Soderqvist | E05F 1/105 |
| 2005/0073425 | A1 | 4/2005 | Snell et al. | |
| 2013/0145692 | A1 * | 6/2013 | Laird | E05F 15/73 49/31 |
| 2013/0263511 | A1 | 10/2013 | Agam et al. | |
| 2015/0059248 | A1 | 3/2015 | Iwata et al. | |
| 2015/0262438 | A1 * | 9/2015 | Zasowski | G06F 3/0482 49/506 |
| 2019/0292835 | A1 * | 9/2019 | Soderqvist | E05F 15/79 |

* cited by examiner

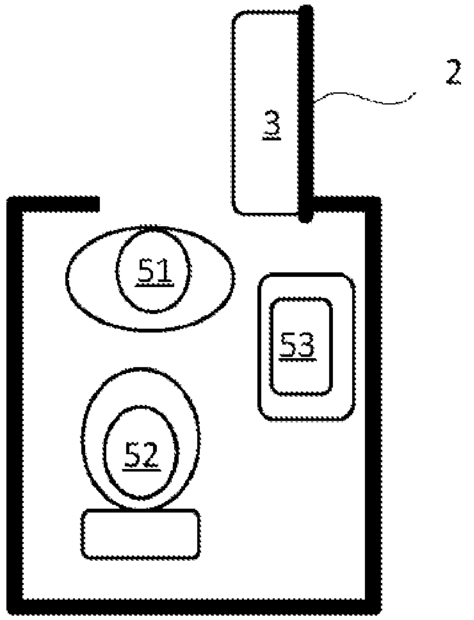
Figure 1a – Prior art
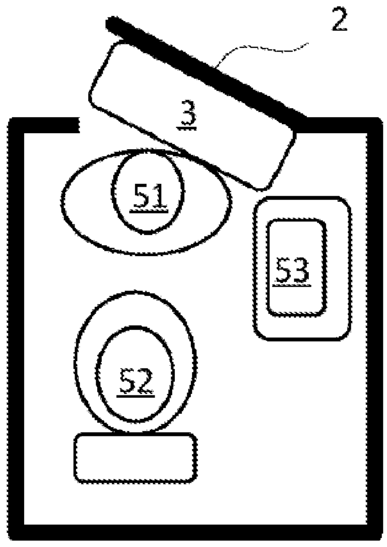
Figure 1b – Prior art
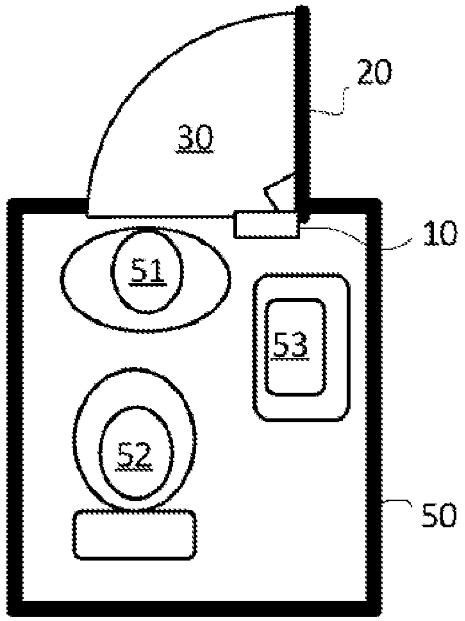
Figure 2a
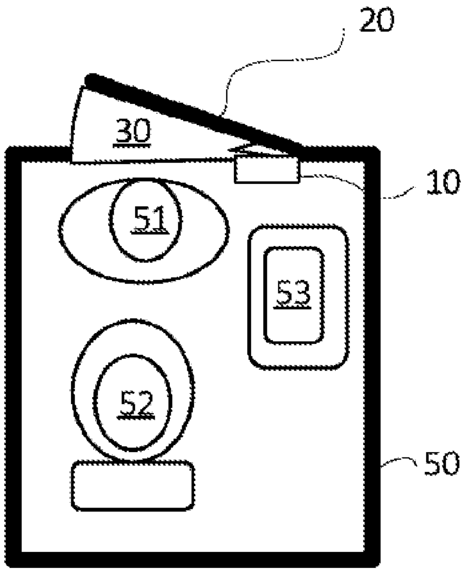
Figure 2b 50
10
106
30
201
107
20
40
202

SWING DOOR OPERATOR

This application is a 371 of PCT/EP2020/061858, filed on Apr. 29, 2020, published on Nov. 19, 2020 under publication number WO 2020/229175, which claims priority benefits from Swedish Patent Application No. 1930154-8, filed on May 13, 2019, the disclosure of which is incorporated herein by reference.

FIELD OF THE INVENTION

The present invention relates to a swing door operator for moving a swing door leaf in a swing path between an open and closed position, a swing door and a room with a swing door. More specifically, the disclosure relates to a swing door operator for moving a swing door leaf in a swing path between an open and closed position, a swing door and a room with a swing door as defined in the introductory parts of claim 1, claim 14 and claim 15.

BACKGROUND ART

Doors that open automatically are widely used throughout the modern society, especially in public buildings and offices. When automated doors are used in narrow compartments, as e.g. public toilets, the automated door is often equipped with a sensor for preventing the door from closing if a person is standing in the way of the door leaf In that way it is prevented that a person gets hit by the door leaf. Such a solution may, however, lead to that the sensor detects a person inside the narrow compartment and the door will not close since current sensors normally maintain its sensor detection field independent of door angle. This means that there is a safety field of a minimum of 200 mm from the door into the narrow compartment when the door is almost closed. The problem has been solved by ignoring the signal from the sensor when the door closes its last part of the closing cycle, which increases the risk of injury to the person inside the narrow compartment.

There is thus a problem in the industry when it comes to safety during the closing cycle of automatic doors. Further, the user experience is affected when an automatic door re-opens or the closing is delayed when the user is inside the room but close enough to the door to trigger the detector.

SUMMARY

It is an object to mitigate, alleviate or eliminate one or more of the above-identified deficiencies in the art and disadvantages singly or in any combination and solve at least the above mentioned problem. According to a first aspect there is provided a swing door operator for moving a swing door leaf in a swing path between an open and closed position, the swing door operator comprising at least one drive unit being arranged to move the swing door leaf between the open and closed position, the swing door operator further comprising a control unit being operatively connected to the drive unit and a first sensor, wherein the first sensor is configured to identify objects in front of a first side of the swing door leaf, the control unit is configured to react if an object is identified by the first sensor in a safety zone in front of the first side of the swing door leaf, the control unit is configured to adapt the size/area of the safety zone based on the swing path of the swing door leaf and the position of the swing door leaf.

The safety zone may thus be limited to the area in from of the first side of the door leaf in which area the door will travel during its path between an open and closed position during the closing operation of the door leaf. The safety zone is thus e.g. formed as a circle sector limited by the door leaf and the closed position or doorway/doorframe. This leads to the advantage that the safety zone can be active during the entire closing procedure of the door while still allowing a person inside a narrow compartment, as e.g. a toilet, to use the full space within the compartment without being detected by the first sensor. Also, there is no chance of the automatic door re-opening or delaying the closing due to a user that is fully inside the compartment but close to the doorway.

According to some embodiments, the swing door comprises a door position sensor to keep track of the position of the door at all times. The door position sensor may be an angle sensor or a gyroscope or any other suitable sensor for direct or indirect measurement of the door leaf angular position. The door leaf angular position is used for the control unit to limit the safety zone area.

According to some embodiments, the control unit is configured to reduce the size/area of the initial safety zone with area of the safety zone that is not in front of a first side of the swing door leaf at the current swing path position of the swing door leaf.

According to some embodiments, the control unit is configured to stop movement of the swing door leaf if an object is identified by the first sensor in a safety zone in front of the first side of the swing door leaf. To stop the swing door leaf movement when an object is detected in the safety zone is a safe way to avoid impact between the swing door leaf and the detected object.

According to some embodiments, the first sensor is adapted to measure distance to a detected object, and the reaction of the control unit upon detecting an object in the safety zone depends on a detected distance to the object. This may be used by the operator to slow down the movement of the swing door leaf if the distance to a detected object in the safety zone is above a predetermined threshold, and stop the movement if the distance to a detected object in the safety zone is below the predetermined threshold. The speed of the movement of the swing door leaf can e.g. be adjusted as a function of the detected distance so that the door will slow down and stop before impact with the detected object in a smooth way. If the detected object moves out from the safety zone after the swing door leaf has started to slow down, it may then speed up the closing movement again. This saves energy used to run the swing door operator as a detected object that is only temporary in the safety zone and at a distance from the door will only slow down the movement temporary.

According to some embodiments, the swing door operator comprises a second sensor configured to identify objects in front of a second side of the swing door leaf, wherein the control unit is configured to react if an object is identified by the second sensor in a second safety zone in front of the second side of the swing door leaf, the control unit is configured to adapt the size/area of the second safety zone based on the swing path of the swing door leaf and the position of the swing door leaf. Object can thus be detected also in the swing path of the swing door leaf when opening the door from a closed position to an open position.

According to some embodiments, the swing door operator comprises a memory and communication means, wherein the control unit is configured to set the maximum size of the safety zone and/or the second safety zone based on limitation information stored on the memory and wherein the limitation information may be changed via external connection to the communication means.

In that case different instructions to the control unit of the swing door operator can be given for different situations. E.g. if a fire alarm is set off, the second safety zone may be omitted to make sure that door will open. If a temporary obstacle, e.g. a vase is placed in the normal second safety zone, the open end position of the swing door leaf may be changed.

According to some embodiments, the swing door leaf may be manually opened also when the swing door operator has stopped the movement of the swing door leaf so as to make sure that the swing door operator can never trap a person in a room.

According to some embodiments, the swing door leaf is a door for small rooms or narrow compartments as e.g. a public toilet.

According to some embodiments, the first sensor, second sensor and/or the position sensor is at least one built-in sensor of the motor.

According to some embodiments, the control unit is configured to initiate/activate and perform autonomous operation of the door operator in cooperation with the sensor. When an open door e.g. detects via the first sensor a person going through the door, the closing of the swing door leaf may be initiated automatically.

According to some embodiments, the motor is an electric motor, which is convenient as electric motors may be small, strong and reliable.

According to a second aspect there is provided a swing door comprising a swing door operator according to the first aspect.

According to a third aspect there is provided a room with a swing door according to the second aspect, wherein the swing door is arranged to open in an outward direction.

Effects and features of the second and third aspects are to a large extent analogous to those described above in connection with the first aspect. Embodiments mentioned in relation to the first aspect are largely compatible with the the second and third aspects.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying drawings.

FIG. 1*a* shows a top view of a public toilet with a swing door having a safety zone according to the prior art.

FIG. 1*b* shows a top view of a public toilet with a swing door having a safety zone according to the prior art where the door has problems closing.

FIG. 2*a* shows a top view of a public toilet with a swing door having a safety zone according to an embodiment of the present disclosure.

FIG. 2*b* shows a top view of the public toilet of FIG. 2*a* with the doors almost close, where the safety zone has been reduced in proportion to the angular position of the swing door leaf.

DETAILED DESCRIPTION

Figure 3:
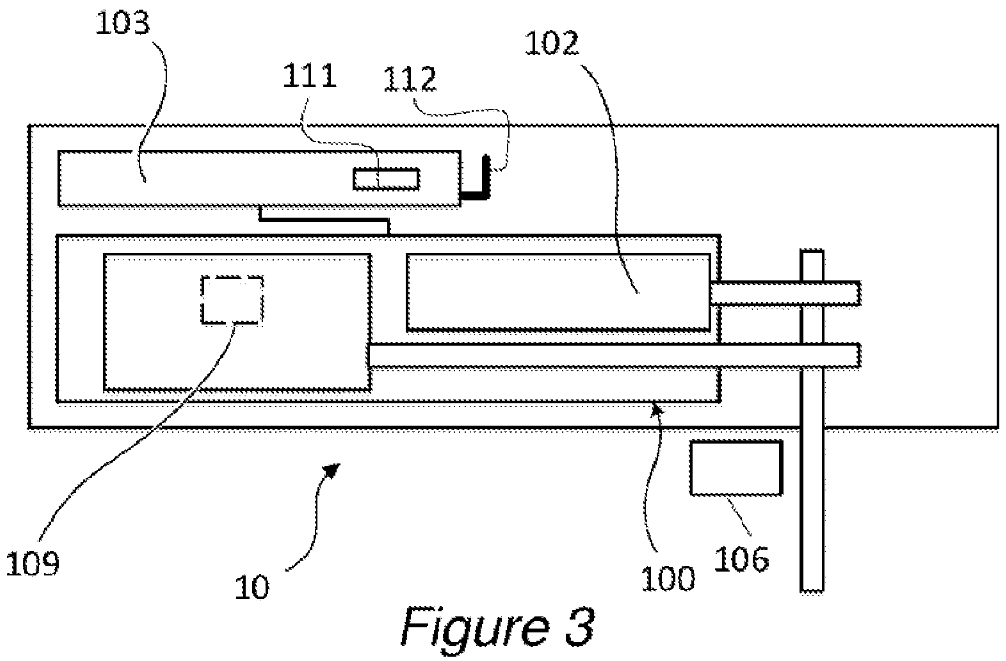
FIG. 3 is a detailed schematic view of a swing door operator according one embodiment of the invention.
Figure 4:
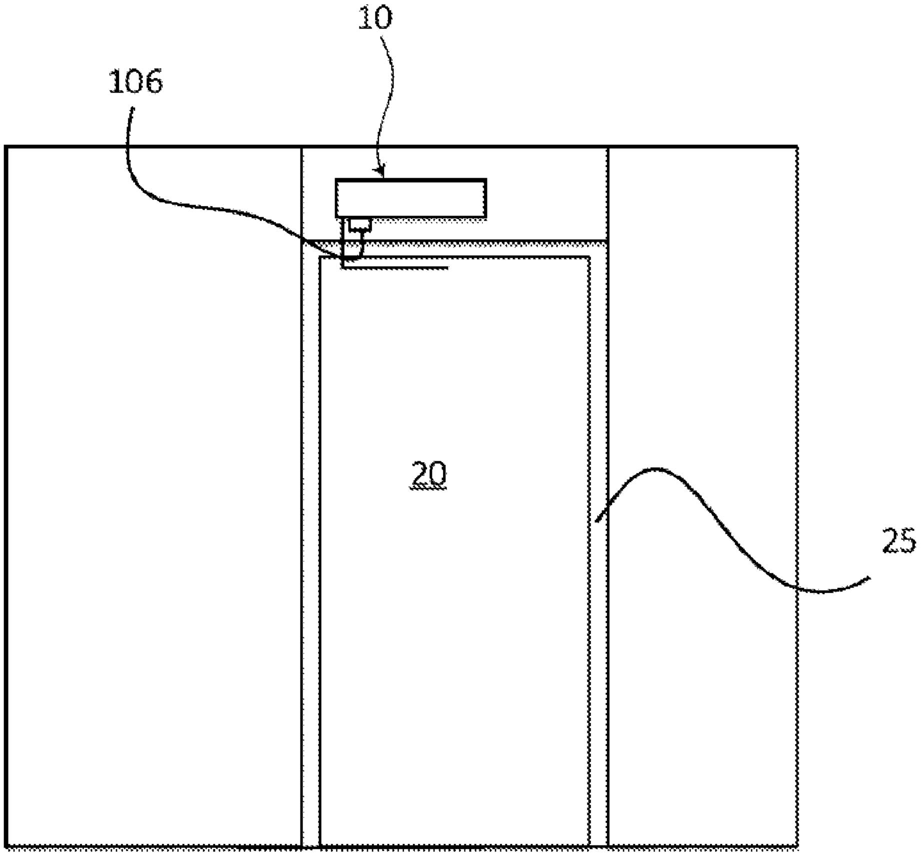
FIG. 4 is a side view of a swing door with a swing door operator according to one embodiment according to the invention.
Figure 5:
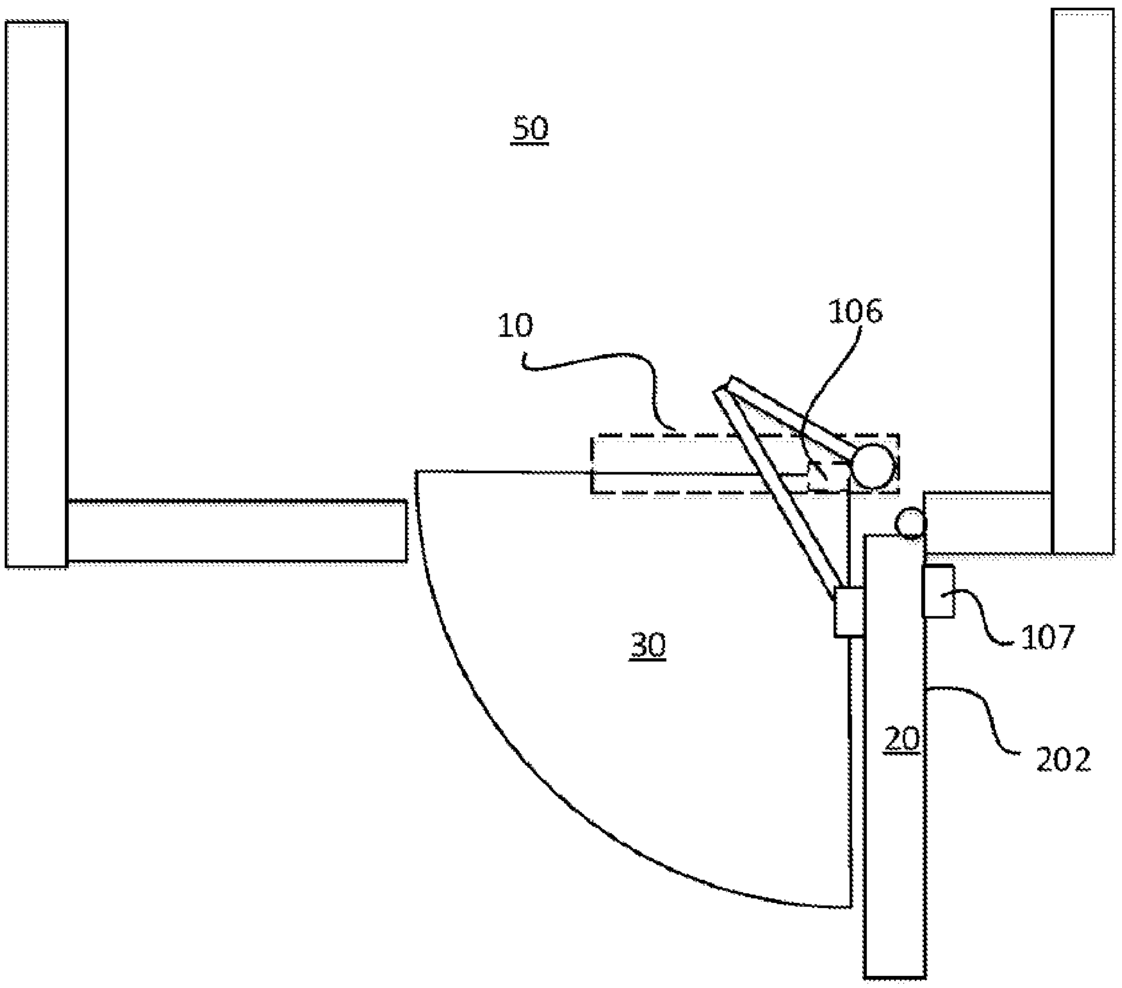
FIG. 5 is a detailed top view of a swing door with a swing door operator according to one embodiment according to the invention.

The present invention will now be described with reference to the accompanying drawings, in which currently preferred example embodiments of the invention are shown. This invention may, however, be embodied in many different forms and should not be construed as limited to the herein disclosed embodiments. The disclosed embodiments are provided to fully convey the scope of the invention to the skilled person.

FIG. 1*a* shows a top view of a public toilet with a swing door 2 having a safety zone 3 according to the prior art. The public toilet comprises a toilet 52, a sink 53 and a person is standing in the room. In FIG. 1*b* the door of FIG. 1*a* has problems closing due to the static safety zone 3 which moves with the door so that it gradually covers more and more space inside the toilet as the door leaf 2 closes. In the situation shown in FIG. 1*b* the person 51 will be detected by door operator as he/she is within the safety zone and the door will re-open or stop closing.

FIG. 2*a* shows a top view of a room (50), e.g. a public toilet, with a swing door having a safety zone 30 according to an embodiment of the present disclosure. A swing door operator 10 can be seen with an arm holding the door leaf 20. In FIG. 2*b* the swing door leaf 20 in FIG. 2*a* has almost closed, whereby the safety zone 30 has been reduced in proportion to the angular position of the swing door leaf 20.

FIG. 3 is a more detailed schematic view of a swing door operator 10 according one embodiment of the invention showing a swing door operator 10 for moving a swing door leaf 20 in a swing path between an open and closed position. The swing door operator 10 comprises at least one drive unit 100 arranged to move the swing door leaf 10 between the open and closed position. The swing door operator 10 further comprises a control unit 103 that is operatively connected to the drive unit 100 and a first sensor 106. The first sensor 106 is configured to identify objects in front of a first side 201 of the swing door leaf 20 and the control unit 103 is configured to react if an object is identified by the first sensor 106 in a safety zone 30 in front of the first side 201 of the swing door leaf 20. The control unit 100 is further configured to adapt the size/area of the safety zone 30 based on the swing path of the swing door leaf 20 and the position of the swing door leaf 20. The swing comprises a door position sensor 109 to keep track of the angular position of the swing door leaf 20. The door position sensor 109 is e.g. an angle sensor or a gyroscope. The sensor 109 may be a built-in sensor of the motor 101 e.g. counting the revolutions of the motor so that the control unit 103 can calculate the corresponding door leaf 20 position.

As the door leaf closes the control unit 100 is configured to reduce the size/area of the initial safety zone 30 with area of the safety zone 30 that is not in front of a first side 201 of the swing door leaf 20 at the current swing path position of the swing door leaf 20. If an object is identified by the first sensor 106 in a safety zone 30 in front of the first side 201 of the swing door leaf 20 the control unit 103 is configured to stop movement of the swing door leaf 20 so that a person standing in the safety zone will not be hit by the door leaf. In one embodiment, wherein the control unit 103 is configured to only stop movement of the swing door leaf (20) if an object is identified by the first sensor 106 in the safety zone 30 in front of the first side 201 of the swing door leaf 20.

In some embodiments the first sensor 106 is adapted to measure distance to a detected object, and the reaction of the control unit 103 upon detecting an object in the safety zone 30 depends on a detected distance to the object. The operator may e.g. slow down the movement of the swing door leaf 20 if the distance to a detected object in the safety zone 30 is above a predetermined threshold, and stop the movement if the distance to a detected object in the safety zone 30 is below the predetermined threshold. Optionally the speed of the movement of the swing door leaf 20 I adjusted as a function of the detected distance to a detected object in the safety zone 30 so that a the door will smoothly come to a stop before it hits a person standing in the safety zone. It the person moves out from the safety zone, e.g. into the room, the door can increase the speed and continue the closing of the door leaf.

In one embodiment, the control unit 100 is configured to ignore objects detected by the first sensor 106 in the area of the safety zone 30 that is not in front of the first side 201 of the swing door leaf 20 at the current swing path position of the swing door leaf 20.

Figure 6:
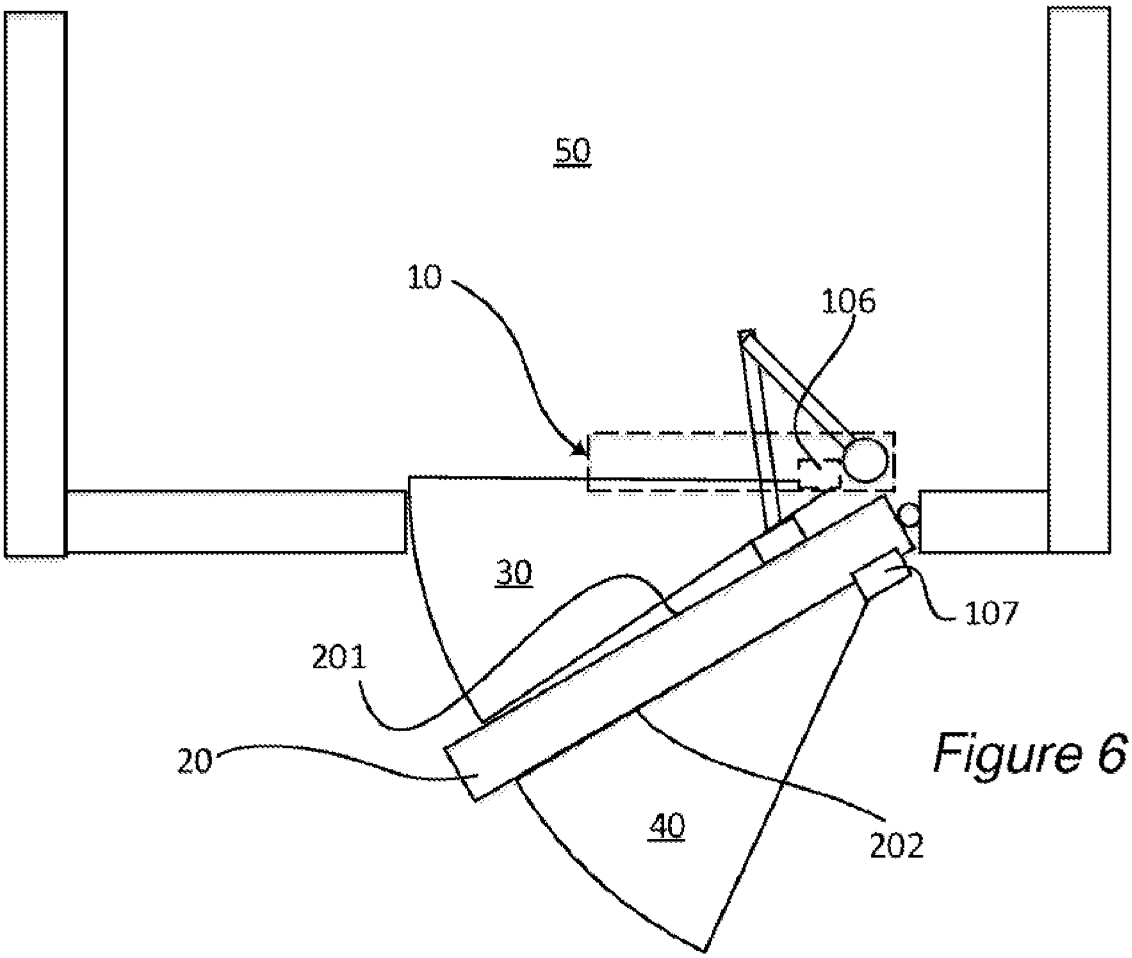
FIG. 6 is a detailed top view of a swing door with a swing door operator according to FIG. 5 where the swing door leaf is partly closed and the safety zone has been reduced according to the angular position of the swing door leaf.

As shown in FIG. 6 the swing door operator may comprise (or be connected to) a second sensor 107 configured to identify objects in front of a second side 202 of the swing door leaf 20. The control unit 103 is configured to react if an object is identified by the second sensor 107 in a second safety zone 40 in front of the second side 202 of the swing door leaf 20. The control unit 100 is in turn configured to adapt the size/area of the second safety zone 40 based on the swing path of the swing door leaf 20 and the position of the swing door leaf 20. Compared to the prior art, the door will not detect objects placed behind the door in the open position of the door leaf 20.

As shown in FIG. 3 the swing door operator may further also comprise a memory 111 and communication means 112. The control unit 103 is configured to set the maximum size of the safety zone 30 and/or the second safety zone 40 based on limitation information stored on the memory 111. The limitation information may be changed via external connection to the communication means 112 so that customized safety zones may be used or the safety zone may be changed for a door due to unique circumstances, e.g. if a permanent obstacle presents problems or if a temporarily object has to be placed in part of the safety zone 30 or the second safety zone 40.

The swing door leaf 20 may further be manually opened also when the swing door operator 10 has stopped the movement of the swing door leaf 20 so that a person never can be trapped in a room by the door. This is especially important as the door has clear benefits for use in small rooms as public toilets and cupboards where there are often no other exit possibilities.

The control unit 103 may further be configured to initiate/activate and perform autonomous operation of the door operator 10 in cooperation with the sensor 106. When an open door e.g. detects via the first sensor 106 a person 53 is going through the door frame 25, the closing of the swing door leaf may be initiated automatically.

The person skilled in the art realizes that the present invention is not limited to the preferred embodiments described above. The person skilled in the art further realizes that modifications and variations are possible within the scope of the appended claims. For example, the first sensor 106 and/or second sensor 107 may be any suitable sensor able to detect the distance to objects over a sector area. The sensors may e.g. also be an array sensor row placed at the door leaf 20 top edge adapted to be controlled in line with the described invention. Additionally, variations to the disclosed embodiments can be understood and effected by the skilled person in practicing the claimed invention, from a study of the drawings, the disclosure, and the appended claims.

The invention claimed is:

1. A swing door operator for moving a swing door leaf in a swing path between an open and closed position, the swing door operator comprising at least one drive unit being arranged to move the swing door leaf between the open and closed position, the swing door operator further comprising a control unit being operatively connected to the drive unit and a first sensor, wherein the first sensor is configured to identify objects in front of a first side of the swing door leaf, the control unit is configured to react to an object identified by the first sensor in a safety zone in front of the first side of the swing door leaf, the control unit is configured to adapt a size or area of the safety zone based on a swing path of the swing door leaf and a position of the swing door leaf, further comprising a memory and communication means, wherein the control unit is configured to set a maximum size of the safety zone based on limitation information stored on the memory and wherein the limitation information is changed via external connection to the communication means.

2. The swing door operator according to claim 1, further comprising a door position sensor.

3. The swing door operator according to claim 2, wherein the door position sensor is an angle sensor or a gyroscope.

4. The swing door operator according to claim 1, wherein the control unit is configured to reduce the size or area of the initial safety zone with an area of the safety zone that is not in front of a first side of the swing door leaf at the current swing path position of the swing door leaf.

5. The swing door operator according to claim 4, wherein the control unit is configured to ignore objects detected by the first sensor in the area of the safety zone that is not in front of the first side of the swing door leaf at the current swing path position of the swing door leaf.

6. The swing door operator according to claim 1, wherein the control unit is configured to stop movement of the swing door leaf if the object is identified by the first sensor in the safety zone in front of the first side of the swing door leaf.

7. The swing door operator according to claim 6, wherein the control unit is configured to only stop movement of the swing door leaf if the object is identified by the first sensor in the safety zone in front of the first side of the swing door leaf.

8. The swing door operator according to claim 1, wherein the first sensor is adapted to measure a distance to a detected object, and a reaction of the control unit upon detecting an object in the safety zone depends on the detected distance to the object.

9. The swing door operator according to claim 8, wherein the operator is adapted to slow down a movement of the swing door leaf if the distance to the detected object in the safety zone is above a predetermined threshold, and stop the movement if the distance to the detected object in the safety zone is below the predetermined threshold.

10. The swing door operator according to claim 9, wherein, if the distance to the detected object in the safety zone is above the predetermined threshold, adjust a speed of the movement of the swing door leaf as a function of the detected distance.

11. The swing door operator according to claim 1, further comprising a second sensor configured to identify objects in front of a second side of the swing door leaf, wherein the control unit is configured to react if the object is identified by the second sensor in a second safety zone in front of the second side of the swing door leaf, the control unit is configured to adapt a size or area of the second safety zone based on the swing path of the swing door leaf and the position of the swing door leaf.

12. The swing door operator according to claim 11, wherein the first sensor, the second sensor or a position sensor is a built-in sensor of a motor.

13. The swing door operator according to claim 1, wherein the swing door leaf (20) is a door for small rooms.

14. The swing door operator according to claim 1, wherein the control unit is configured to activate and perform autonomous operation of the door operator in cooperation with the first sensor.

15. A swing door comprising a swing door operator according to claim 1.

16. A room with a swing door according to claim 15, wherein the swing door is arranged to open in an outward direction.

17. A swing door operator for moving a swing door leaf in a swing path between an open and closed position, the swing door operator comprising at least one drive unit being arranged to move the swing door leaf between the open and closed position, the swing door operator further comprising a control unit being operatively connected to the drive unit and a first sensor, wherein the first sensor is configured to identify objects in front of a first side of the swing door leaf, the control unit is configured to react to an object is identified by the first sensor in a safety zone in front of the first side of the swing door leaf, the control unit is configured to adapt a size or area of the safety zone based on a swing path of the swing door leaf and a position of the swing door leaf, further comprising a second sensor configured to identify objects in front of a second side of the swing door leaf, wherein the control unit is configured to react if the object is identified by the second sensor in a second safety zone in front of the second side of the swing door leaf, the control unit is configured to adapt a size or area of the second safety zone based on the swing path of the swing door leaf and the position of the swing door leaf, further comprising a memory and communication means, wherein the control unit is configured to set a maximum size of the safety zone or the second safety zone based on limitation information stored on the memory and wherein the limitation information is changed via external connection to the communication means.

* * * * *